July 15, 1958 C. E. COMPTON Re. 24,503

ADVANCEABLE MINING MACHINE HEAD AND SHAFT CARRIED BEARING SUPPORT THEREFOR

Original Filed Dec. 5, 1952 3 Sheets-Sheet 1

INVENTOR

Charles E. Compton by Hoopes, Leonard & Klenn his attorneys

INVENTOR
Charles E. Compton
By Hoppe, Leonard & Green
his attorneys

July 15, 1958 C. E. COMPTON Re. 24,503

ADVANCEABLE MINING MACHINE HEAD AND SHAFT CARRIED BEARING SUPPORT THEREFOR

Original Filed Dec. 5, 1952 3 Sheets-Sheet 3

INVENTOR
Charles E. Compton
By Hoopes, Leonard & Kahn
his attorneys

United States Patent Office

Re. 24,503
Reissued July 15, 1958

24,503

ADVANCEABLE MINING MACHINE HEAD AND SHAFT CARRIED BEARING SUPPORT THEREFOR

Charles E. Compton, Bridgeport, W. Va.

Original No. 2,751,203, dated June 19, 1956, Serial No. 324,368, December 5, 1952. Application for reissue June 10, 1957, Serial No. 665,626

1 Claim. (Cl. 262—7)

Matter enclosed in heavy brackets [ ] appears in the original patent but forms no part of this reissue specification; matter printed in italics indicates the additions made by reissue

This invention relates to mining machine heads and particularly to mining machine heads comprising a rotatable and advanceable shaft together with means carried by the shaft at the forward end thereof for cutting into a body of material to be mined and removing material from said body to form a bore in said body.

Mining machine heads of the general type to which my invention is applicable are shown in my Patents Nos. 2,562,841, 2,594,256 [and], 2,616,677, *2,764,397 and 2,784,955* [and in various of my pending applications including, for example, application Serial No. 202,898, filed December 27, 1950, and application Serial No. 281,085, filed April 8, 1952]. A mining machine in which such heads may be employed is disclosed in my said [Patent No.] *Patents Nos.* 2,616,677 and [my said application Serial No. 202,898] *2,764,397.*

In the use of mining machine heads as referred to above the head is rotated and advanced by rotating and advancing the shaft which forms the primary supporting and operating member of the head. Such heads are used primarily in the mining of coal although they may be used otherwise. For present purposes the use of such heads in the mining of coal will be considered by way of example. As the head advances into the body of coal to be mined it forms a bore in such body of coal, the coal which was initially disposed at the location of the bore being broken up and conveyed rearwardly or in the direction opposite the direction in which the head advances. It is desirable that the head move forward through the body of coal in a straight line. However, there is a tendency for the head to drift downwardly and to one side due to gravity and the rotation of the head. My invention is concerned with preventing or counteracting to a great extent the drifting of the head.

I provide bearing means for the shaft rearwardly of the cutting means which are disposed at the forward portion of the head, the bearing means being advanceable with the shaft and having a portion engaging the shaft to rotatably carry the shaft and a portion extending outwardly from the first mentioned portion a radial distance from the axis of the shaft approximating the radius of the cutting means to enter and bear against the bore and thereby support the first mentioned portion of the bearing means. The effect of the bearing means is to counteract the tendency of the head to drift downwardly by supporting the head so that its full weight does not bear upon the bottom of the bore and to counteract the tendency of the head to drift sidewise by steering the head forwardly in an axial direction. In addition the efficiency of the head is increased as the head operates relatively freely and the tendency for the head to rub against the bore to the accompaniment of great frictional resistance is obviated.

I may provide a bearing engaging member insertable into the shaft upon which the head is mounted and rigidly fastenable to the shaft rearwardly of the cutting means so as in effect to form an integral part of the shaft together with a bearing member cooperable with the bearing engaging member and advanceable therewith, the bearing member having a portion substantially surrounding the bearing engaging member to rotatably carry the bearing engaging member and hence through the shaft to rotatably support the cutting means and a portion extending outwardly from the first mentioned portion a radial distance from the axis of the shaft approximating the radius of the cutting means to enter and bear against the bore and thereby support the first mentioned portion of the bearing member.

In a preferred structure I employ a plurality of generally outwardly extending spoke-like portions rigidly connected with the portion of the bearing means engaging the shaft and supporting means carried by the spoke-like portions at a radial distance from the axis of the shaft approximating the radius of the cutting means to enter and bear against the bore and thereby support the first mentioned portion of the bearing means.

I may employ generally outwardly extending connecting means carried by the portion of the bearing means engaging the shaft and supporting means carried by the connecting means at a radial distance from the axis of the shaft approximating the radius of the cutting means and extending generally in the direction of the axis of the shaft to enter and bear against the bore and thereby support the first mentioned portion of the bearing means. The connecting means preferably provide a freely open material passage generally parallel to the axis of the shaft past the bearing means through which material removed from the body of material being mined may pass. The supporting means may comprise a plurality of circumferentially spaced supporting members carried by the connecting means and extending generally in the direction of the axis of the shaft.

I preferably employ screw conveyor means extending from the cutting means to a position radially inwardly of the supporting means to convey rearwardly upon rotation of the head material removed from the body of material being mined by the cutting means. The screw conveyor means at the cutting means may have a radius closely approaching the radius of the cutting means but may be of reduced radius at the portion of the screw conveyor means disposed radially inwardly of the supporting means.

I prefer to utilize supporting means having effective supporting portions disposed substantially apart axially of the shaft. In this way I most effectively guide the head forward in an approximately straight line. The greater the distance axially of the shaft between the effective supporting portions of the supporting means the greater will be the tendency of the head to move forward in a straight line. I find that for optimum results the effective supporting portions of the supporting means should be disposed apart axially of the shaft a distance at least about double the diameter of the cutting means. In some forms of head which I have made employing such supporting means the effective supporting portions of the supporting means have been disposed apart axially of the shaft a distance several times—in some cases as much as seven or eight times—the diameter of the cutting means. This insures accuracy of guiding of the head just as the wide spacing of the front and rear sights of a rifle insures accurate aiming of the rifle.

The supporting means may be continuous axially of the shaft and in one form of head I have made the supporting means continuous for a distance at least about double the diameter of the cutting means. In another form of head I have made the supporting means discontinuous axially of the shaft and having separate supporting portions disposed apart axially of the shaft a distance at least about double the diameter of the cutting means. When screw conveyor means are employed with discontinuous supporting means the screw conveyor means may extend from the cutting means to a position radially inwardly of the forward supporting portion of the supporting means and further rearwardly to convey rearwardly upon rotation of the head material removed from the body of material being mined by the cutting means, the screw conveyor means at the cutting means and also rearwardly of the forward supporting portion having a radius closely approaching the radius of the cutting means but being of reduced radius at the portion thereof disposed radially inwardly of the forward supporting portion.

Other details, objects and advantages of the invention will become apparent as the following description of certain present preferred embodiments thereof proceeds.

In the accompanying drawings I have shown certain present preferred embodiments of the invention in which.

Figure 1:
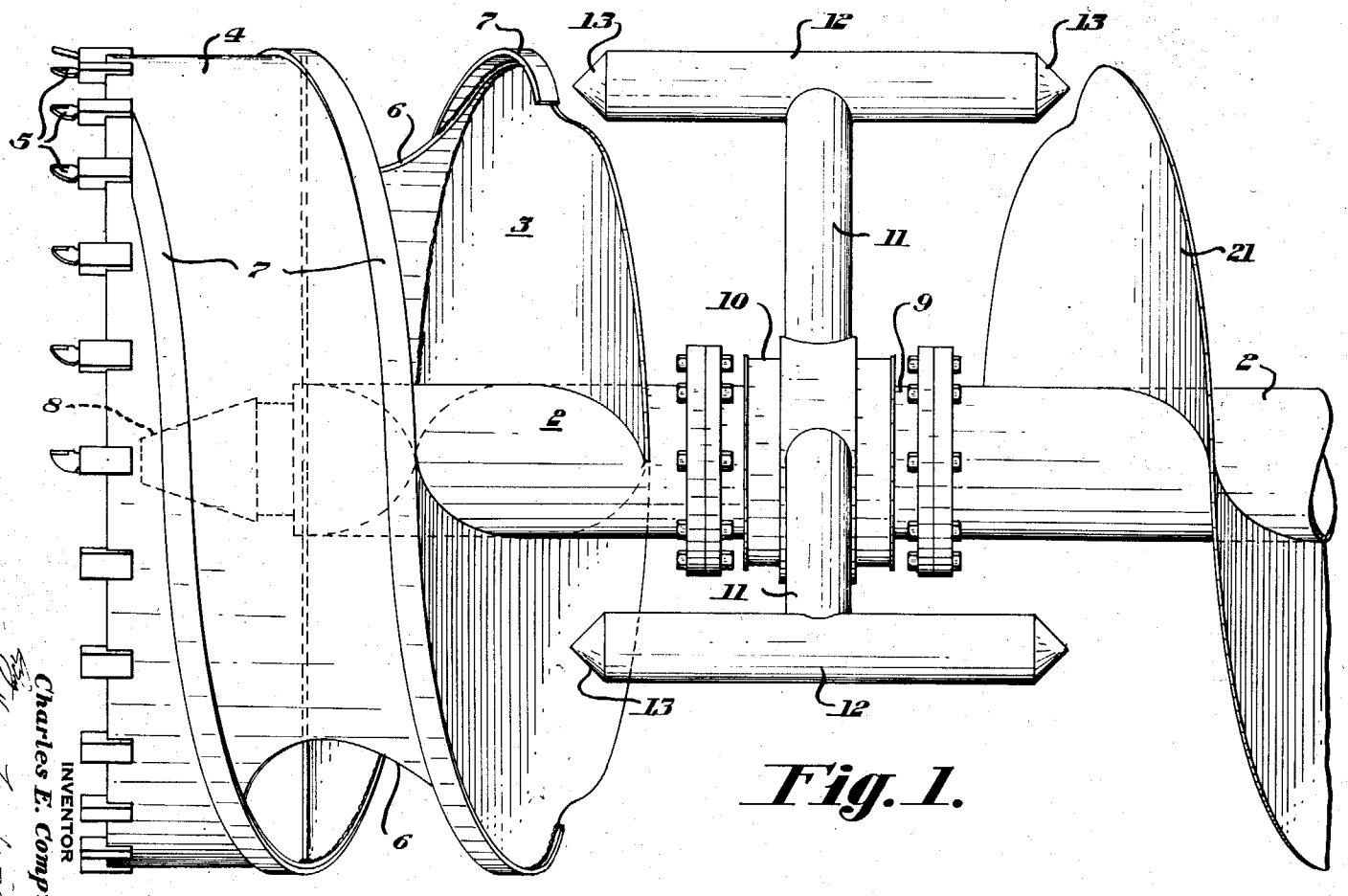
Figure 1 is a fragmentary side elevational view of a mining machine head.

Referring first to Figure 1, that figure shows a mining machine head comprising a rotatable and advanceable shaft 2 with means carried by the shaft at the forward end thereof for cutting into a body of material to be mined and removing material from said body to form a bore in said body. Welded to the shaft 2 is a screw conveyor 3 which at its forward end, i. e., the end toward the left viewing Figure 1, is of relatively great diameter and at its rearward end, i. e., the end toward the right viewing Figure 1, is of relatively small diameter for reasons to be explained below. Welded to the periphery of the portion of the screw conveyor 3 of relatively great diameter and projecting forwardly from the forward end of the screw conveyor is a cylinder 4 carrying at its forward end cutter bits 5 for cutting into the body of material to be mined when the head is rotated and advanced toward the left viewing Figure 1. The cylinder 4 has cut out portions 6 as shown in my said *Patent No. 2,784,955* [application Serial No. 281,085]. Welded to the outside of the cylinder 4 are spirally arranged straps 7 which assist in conveying small particles of the material being mined. The extremity of the shaft 2 is disposed within the cylinder 4 and is provided with a breaker shown only diagrammatically and designated by reference numeral 8. Since the breaker does not constitute my present invention no attempt has been made to show or describe its structure. It may take various forms as shown in my patents and applications above referred to. The function of the breaker is to exert outward force on the material within the cylinder and crack or break that material to enable it to be conveyed or removed toward the right viewing Fig. 1 by the spiral conveyor 3. The breaker 8 may aid in starting the movement of the lumps of material toward the right viewing Figure 1.

The portion of the head above described may take various other forms, the details of the structure shown being susceptible of wide variation in respect of the present invention which is applicable to heads having cutting and conveying means of various forms.

In Figure 1 I have shown a bearing engaging member 9 inserted into the shaft 2 and rigidly fastened to the shaft rearwardly of the cylinder through bolted flanges so as in effect to form an integral part of the shaft. A bearing member 10 is cooperable with the bearing engaging member 9, having a portion substantially surrounding the bearing engaging member to rotatably carry the bearing engaging member and hence through the shaft to rotatably support the cylinder. The bearing engaging member 9 and the bearing member 10 are advanceable with the shaft. Welded to the bearing member 10 and extending outwardly therefrom are three spoke-like portions 11, hereinafter referred to as spokes. The spokes are equally spaced about the bearing member 10 so that they are disposed at angles of 120° to one another. Welded to the outer end of each spoke 11 is an elongated supporting member 12 somewhat in the nature of a skid and which may be constituted by a solid steel rod or a length of strong steel tubing. In either case the ends of each supporting member 12 are preferably tapered as shown at 13, and if tubing is used plates are preferably welded thereto to close the ends.

The three supporting members 12 collectively constitute supporting means disposed at a radial distance from the axis of the shaft approximating the radius of the cylinder 4 carrying the cutter bits 5. The radially outward surfaces of the supporting members 12 may be slightly closer to the axis of the shaft than the cutter bits 5 to avoid binding of the supporting means in the bore. As the head advances into the bore which it forms in the body of material being mined the supporting members 12, or at least two thereof, bear against the surface of the bore and thereby support the cylinder and prevent it from dragging on the bore and largely obviate any tendency of the head to drift downwardly or laterally.

The spiral conveyor 3 is as above mentioned of the full inside diameter of the cylinder 4 at the forward end of the head but is of reduced diameter rearwardly of the cylinder and at the portion of the conveyor disposed radially inwardly of the supporting members 12. Since the supporting members 12 normally do not turn during use of the head while the spiral conveyor 3 does turn it is necessary that the conveyor clear the supporting members.

The spokes 11 provide a freely open material passage generally parallel to the axis of the shaft past the bearing means through which material removed from the body of material being mined may pass. The lumps of material are taken by the conveyor 3 and are delivered rearwardly thereby through the freely open passage or passages provided between the spokes 11. Another conveyor 21 is mounted on the shaft 2 rearwardly of the spokes 11, such conveyor having a forward portion positioned to the left in Figure 1 of the same diameter as the right hand portion of the conveyor 3 and a rearward portion positioned to the right in Figure 1 of the same diameter as the left hand portion of the conveyor 3. Consequently provision is made for removal of the material being mined while at the same time supporting the mining machine head from the bore formed in the body of material being mined independently of the head and cutting means.

Figure 3:
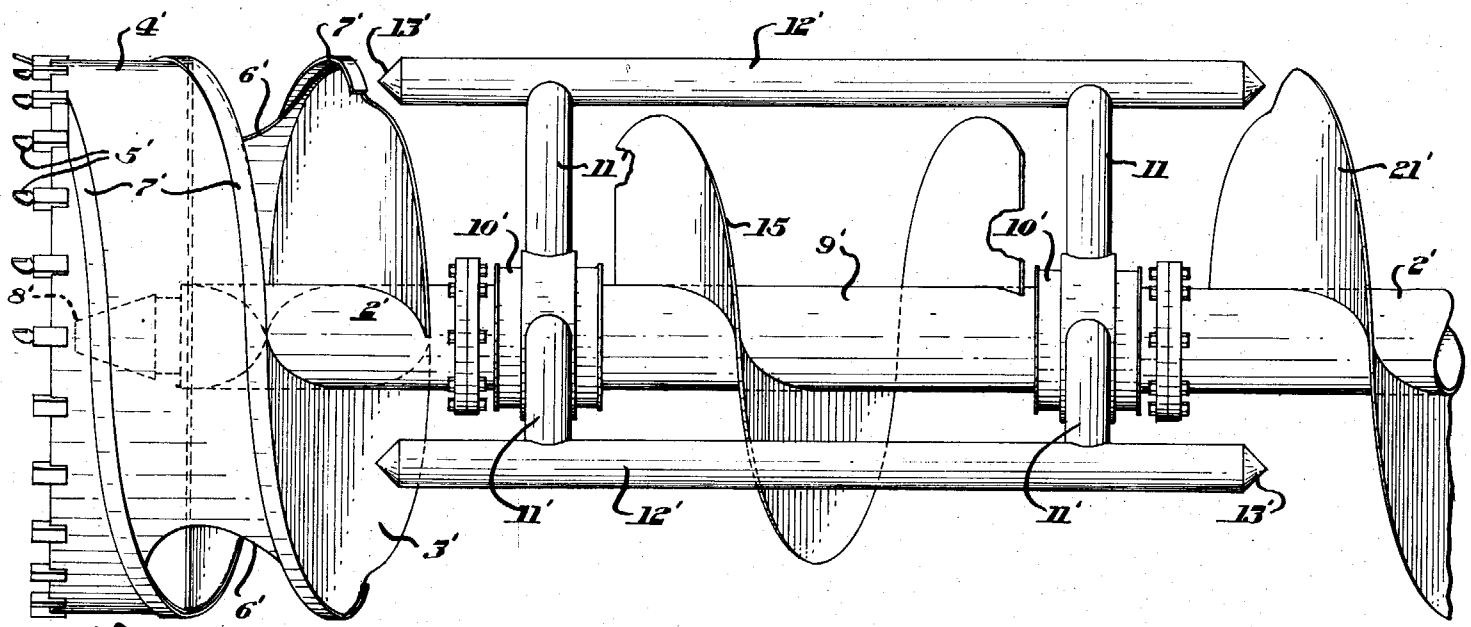
Figure 3 is a fragmentary side elevational view of a modified form of mining machine head.

The structure shown in Figure 3 is similar to that shown in Figure 1 except that in Figure 3 there is inserted into the shaft a member much longer than the member 9 of Figure 1 and having two bearing engaging portions with two bearing members cooperating respectively therewith. In Figure 3 parts corresponding to parts shown in Figure 1 are designated by the same reference numerals but each with a prime affixed.

In Figure 3 an elongated bearing engaging member 9' is introduced into the shaft 2'. Cooperating with the elongated bearing engaging member 9' are two bearing members 10' each having spokes 11' welded thereto. Each assembly consisting of a bearing member 10' and spokes 11' may be identical with the assembly consisting of the member 10 and spokes 11 of Figure 1. Elongated supporting members 12' are provided in the structure shown in Figure 3, those members being analogous to the supporting members 12 of Figure 1 but much longer and each being supported by two aligned spokes 11' as shown. Each supporting member 12' of Figure 3 has a length or a dimension axially of the shaft at least about double the diameter of the cylinder 4'. I find that this insures optimum guiding of the head and results in advance of the head through the body of material being mined in a substantially straight line.

The screw conveyor 3' of Figure 3 is the same as the screw conveyor 3 of Figure 1. In addition there is shown in Figure 3 a length of screw conveyor designated 15 welded to the elongated bearing engaging member 9', the diameter of such length of screw conveyor being the same as the diameter of the right-hand end of the screw conveyor 3'. In operation of the head both screw conveyors turn with the shaft 2' and the member 14 forming part thereof while the supporting means 10'—11'—12' does not turn. Thus the lumps of material being mined are conveyed first by the screw conveyor 3', thence through the freely open material passages provided between the spokes 11' attached to the left-hand bearing member 10', thence by the screw conveyor 15 and thence through the freely open material passages provided between the spokes 11' attached to the right-hand bearing member 10'. A further conveyor 21' is shown in Figure 3 which may take the material from that point, functioning analogously to the conveyor 21 of Figure 1.

Figure 4:
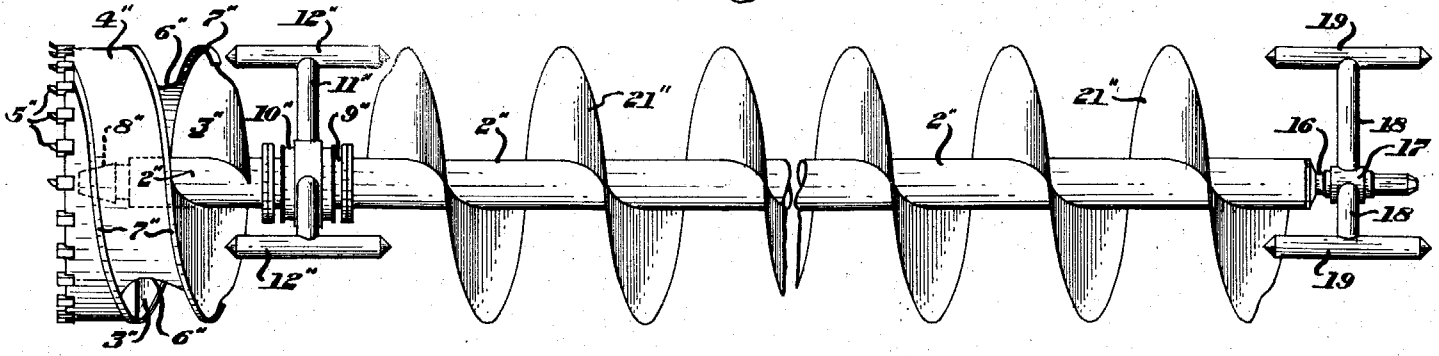
Figure 4 is a side elevational view of a further modified form of mining machine head.

Figure 4 shows a further modified form of mining machine head in which parts corresponding to parts shown in Figure 1 are designated by the same reference numerals but each with a double prime affixed. The left-hand portion of the head shown in Figure 4 is identical with the entire head shown in Figure 1. However, the shaft 2'' of Figure 4 extends to the right a considerable distance, preferably a distance approximating several times the diameter of the cylinder 4'', where it is connected with a bearing engaging member 16 journaled within a bearing member 17 carrying spokes 18 which in turn carry supporting members 19. The assembly 17—18—19 is analogous in structure and function to the assembly 10''—11''—12''. A further conveyor section or shaft may be connected with the right-hand portion of the member 16 and the shaft 2'' may be driven therethrough.

Mounted on the shaft 2'' between the bearing engaging member 9'' and the bearing engaging member 16 is a screw conveyor 21'' which except at its ends is of the same diameter as the portion of the screw conveyor 3'' which is within the cylinder 4''. At its ends where it lies radially inwardly of the supporting members 12'' and 19 the screw conveyor 21'' is of reduced diameter, such diameter being approximately the same as the diameter of the right-hand extremity of the screw conveyor 3''.

Figure 2:
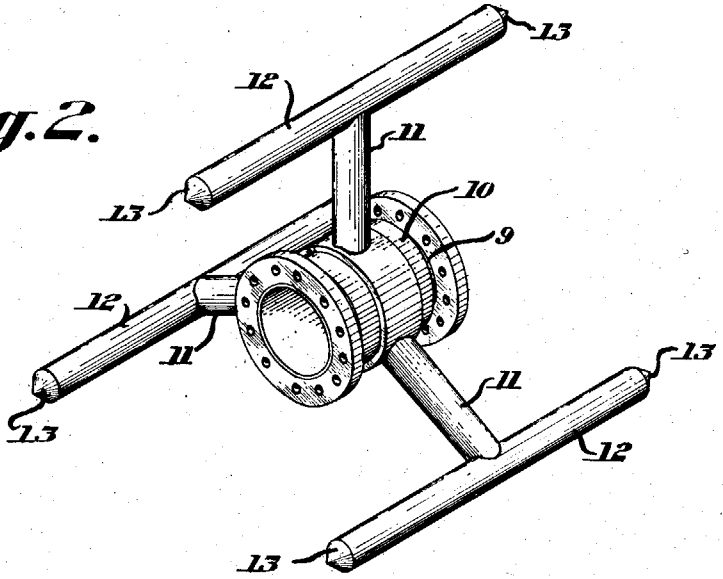
Figure 2 is an isometric view of the mining machine head supporting means shown in Figure 1.

The head of Figure 4 accomplishes substantially the same result as the head of Figure 3 although in Figure 4 the supporting means 12'', 19 is discontinuous while in Figure 2 the supporting means 12' is continuous. In each case, however, the supporting means has effective supporting portions disposed apart axially of the shaft a distance at least about double the diameter of the cylinder and the cutting means 5' or 5''. In each case provision is made for conveying the lumps of mined material rearwardly or to the right past the supporting bearings.

While I have shown and described certain present preferred embodiments of the invention it is to be distinctly understood that the invention is not limited thereto but may be otherwise variously embodied within the scope of the following claims.

I claim:

[1. In a mining machine, a rotatable and advanceable structure comprising a shaft, a head rigidly connected with the shaft at the forward end of the shaft having means for cutting into a body of material to be mined and removing material from said body to form a bore in said body, bearing means rotatably supporting the shaft adjacent the head connected with the shaft so that the shaft is held against substantial movement axially of the shaft relatively to the bearing means, the bearing means having at least three spoke-like portions extending generally outwardly from the shaft spaced apart circumferentially of the shaft providing space for relative movement therepast of large lumps of mined material, an elongated supporting member extending generally parallel to the axis of the shaft carried at the outer end of each of the spoke-like members to guide the head in the bore, the outer surfaces of the elongated supporting members being disposed at a radial distance from the axis of the shaft approximating the radius of the first mentioned means, and conveying means connected and advanceable with the structure for conveying rearwardly material relatively moving past said spoke-like portions.]

*2. In a generally horizontally operable mining machine, a rotatable and advanceable structure comprising a shaft having a spiral conveyor flight connected therewith and extending thereabout, a head rigidly connected with the shaft at the forward end of the shaft having means for cutting into a body of material to be mined and removing material from said body to form a bore in said body, bearing means rotatably supporting the shaft between the head and the spiral conveyor flight on the shaft connected with the shaft so that the shaft is held against substantial movement axially of the shaft relatively to the bearing means, the bearing means having spoke-like portions each of which is non-yielding in the direction of its length extending generally outwardly from the shaft spaced apart circumferentially of the shaft providing space for relative movement therepast of large lumps of mined material, and at least three elongated supporting members spaced apart circumferentially of the shaft extending generally parallel to the axis of the shaft to guide the head in the bore, the outer surfaces of the elongated supporting members being disposed at a radial distance from the axis of the shaft approximating the radius of the first mentioned means, the elongated supporting members being supportingly connected with the spoke-like portions, the elongated supporting members being disposed in such adjacency to the head that the full weight of the head does not bear upon the bottom of the bore, whereby the elongated supporting members counteract the tendency of the head to drift downwardly and to one side due to gravity and the rotation of the head, resulting in formation of a relatively straight bore.*

References Cited in the file of this patent or the original patent

UNITED STATES PATENTS

| | | |
|---|---|---|
| 14,483 | Wilson | Mar. 18, 1856 |
| 790,330 | Terry | May 23, 1905 |
| 1,516,830 | Schafer | Nov. 25, 1924 |
| 1,721,004 | Debose | July 16, 1929 |
| 1,729,211 | Erisman | Sept. 24, 1929 |
| 1,824,466 | Criley | Sept. 22, 1931 |
| 1,866,005 | Beatty | July 5, 1932 |
| 2,177,300 | Kellegrew | Oct. 24, 1939 |
| 2,279,201 | Kozak et al. | Apr. 7, 1942 |
| 2,562,841 | Compton | July 31, 1951 |
| 2,647,726 | Kirk | Aug. 4, 1953 |
| 2,675,213 | Poole et al. | Apr. 13, 1954 |
| 2,696,367 | Robishaw | Dec. 7, 1954 |

FOREIGN PATENTS

| | | |
|---|---|---|
| 14,978 | Germany | Aug. 23, 1881 |